March 23, 1954

C. W. ELSENHEIMER 2,672,776

VISE WITH QUICK-SETTING SLIDE

Filed July 9, 1952

INVENTOR
Charles W. Elsenheimer,

BY

PATENT AGENT.

March 23, 1954
C. W. ELSENHEIMER
2,672,776
VISE WITH QUICK-SETTING SLIDE
Filed July 9, 1952
2 Sheets-Sheet 2
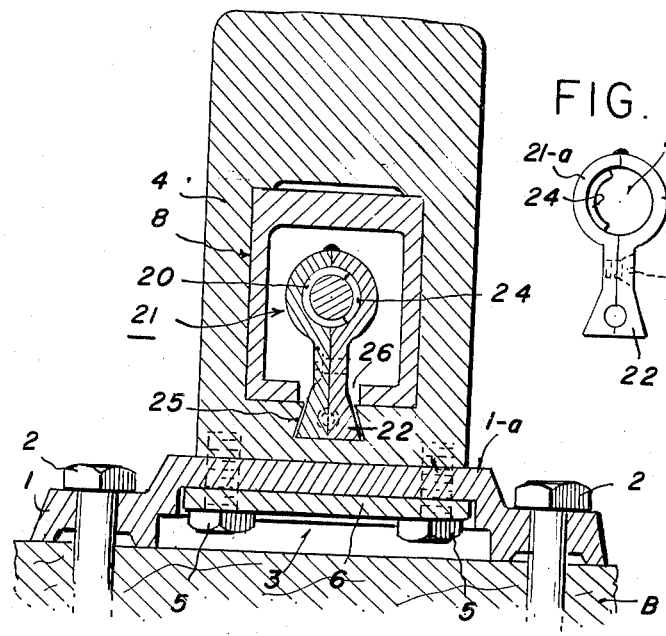
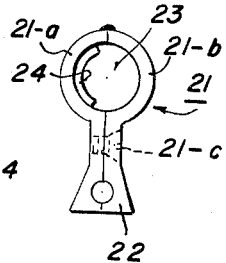
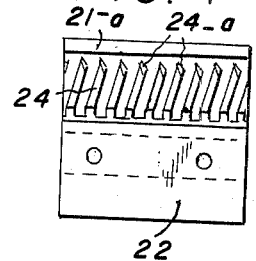
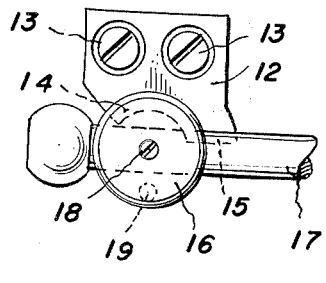
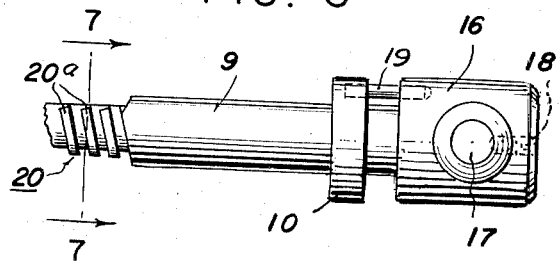
INVENTOR
Charles W. Elsenheimer,
BY
PATENT AGENT.

Patented Mar. 23, 1954

2,672,776

UNITED STATES PATENT OFFICE 2,672,776

VISE WITH QUICK-SETTING SLIDE

Charles W. Elsenheimer, Meriden, Conn., assignor to The Charles Parker Company, Meriden, Conn.

Application July 9, 1952, Serial No. 297,935

5 Claims. (Cl. 81—37)

My invention consists in a new and useful improvement in vises with quick-setting slide and is designed to provide a vise in which the quick setting of the slide carrying the movable jaw is made possible by the fact that the clamping screw has approximately 125° of the thread chased from its circumference and that the nut on the fixed portion of the vise has a thread on 120° of the circumference. By reason of this construction, when the screw is disposed so that the threaded portion of its circumference lies in the unthreaded portion of the circumference of the nut; the slide being disengaged is free to move relative to the fixed portion of the vise to adjust the movable jaw relative to the fixed jaw. When the screw is rotated to engage the screw threads and the nut threads, the slide moves the movable jaw into clamping relation with the fixed jaw. Such action is effected by rotation of the screw within 90° of its circumference. The particularly novel and useful feature of my improved vise is the means for facilitating the engagement of the screw and nut threads. The nut is adjustably mounted on the fixed portion of the vise and provided with means for adjusting the nut axially of the screw so that the threads upon the nut can be positioned for meshing with the threads on the screw when the screw is rotated for the clamping action.

While I have illustrated in the drawings and hereinafter fully describe one specific embodiment of my invention, it is to be distinctly understood that I do not consider my invention to be limited to said specific embodiment but refer for its scope to the claims appended hereto.

In the drawings:

Fig. 2 is a transverse vertical section on the line 2—2 of Fig. 1, when looking in the direction of the arrows.

Fig. 3 is a rear end elevation of the nut.

Fig. 4 is a side elevation of an inside wall of one half portion of the nut.

Fig. 5 is a fragmentary front end elevation of the screw shaft, the operating handle and the stop plate, the screw being in engaged position.

Fig. 6 is a fragmentary top plan of the shaft and screw, in the position shown in Fig. 1.

Fig. 7 is a transverse section on the line 7—7 of Fig. 6, when looking in the direction of the arrows.

Figure 1:
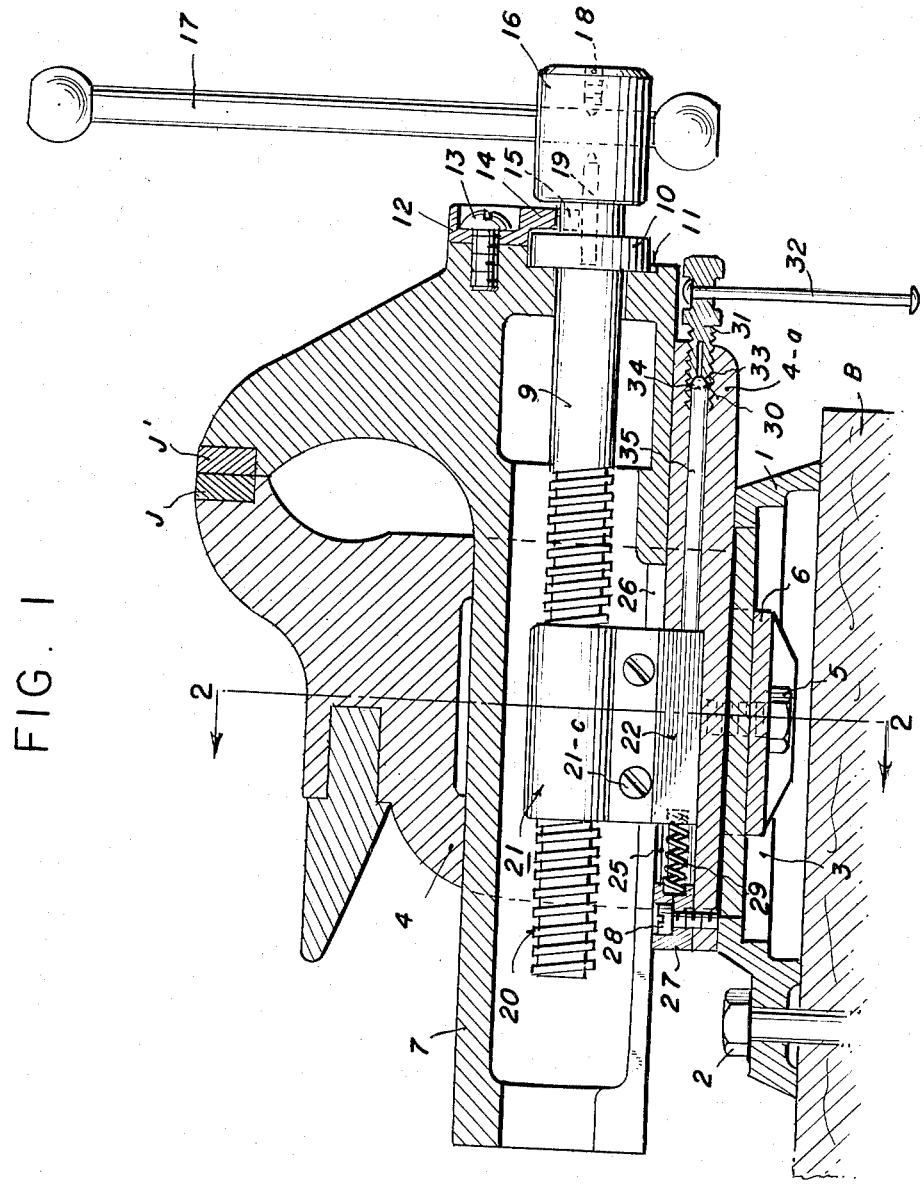
Fig. 1 is a longitudinal vertical section of my improved vise, the screw being in disengaged position.

As shown in the drawings, my improved vise has a base 1 which can be mounted on a bench B by suitable bolts 2, and having a recess 3 on its under side. A post 4 is mounted on the base 1 by bolts 5 transfixing a plate 6 in the recess 3, and the top 1-a of the base 1, and tapped into the post 4 (Fig. 2). The post 4 carries on its end the fixed jaw J of the vise. The movable jaw J' is carried by a hollow slide 7 received in a guideway 8 in the post 4. Suitably journaled in the slide 7 is a rotatable shaft 9 having a peripheral flange 10 located in a suitable socket 11 in the forward end of the slide 7. A bracket 12 is moved by bolts 13 on said end and has a lug 14 to retain the flange 10 in the socket 11, and a stop shoulder 15 (Figs. 1 and 5). The shaft 9 has on its forward end a head 16 through which passes an operating handle 17. A bolt 18 may be provided for fixing the handle 17 relative to the shaft 9. A stop pin 19 is suitably mounted in the flange 10 and the head 16 parallel with the longitudinal axis of the shaft 9 for co-action with the stop shoulder 15.

The shaft 9 is provided on its rear portion with mutilated threads 20. It will be noted (Fig. 7) that the threads 20 are interrupted for approximately 125° of the circumference of the shaft 9. The ends of the threads 20 are suitably beveled, as shown at 20-a in Fig. 6.

A nut 21 is provided for co-action with the threads 20 of the shaft 9. The nut 21 comprises two parts 21-a and 21-b assembled by bolts 21-c and by brazing at the upper ends (Fig. 3). The lower portion of the nut 21 is formed as a key 22 and the upper portion as a bore 23 through which passes the shaft 9 (Fig. 1). The nut 21 has mutilated threads 24. It will be noted (Fig. 3) that the threads 24 are disposed over approximately 120° of the circumference of the bore 23. The ends of the threads 24 are suitably beveled as shown at 24-a in Fig. 4.

The post 4 has a key-way 25 in which is slidably fitted the key 22 of the nut 21 which projects through a slot 26 in the slide 7 so that its bore 23 is co-axial with the shaft 9. The key-way 25 is closed at its rear end by a block 27 mounted on the post 4 by a bolt 28. An expansion spring 29 has one end seated in the block 27 and its other end in the key 22 of the nut 21, biasing the nut 21 toward the forward end of the vise.

The post 4 has an extension 4-a projecting from the base 1 toward the forward end of the vise and having a bore 30 extending axially therethrough. Tapped in the forward end of the bore 30 there is a bolt 31 provided with an operating handle 32. The inner end of the bolt 31 is split and has a conical seat 33 in which is disposed the conical head 34 of a rod 35 slidable in the bore 30 and pressed by the biased nut 21.

Having described the structural details of my improved vise, I will now describe the method of assembling them. The post 4 is mounted on the base 1 by the plate 6 and the bolts 5. The two parts 21-a and 21-b of the nut 21 having been connected by bolts 21-c and by brazing, the nut 21 is mounted on the post 4 by inserting the key 22 into the key-way 25 through its open rear end. The spring 29 is positioned against the key 22 and the block 27 is mounted on the post 4 by the bolt 28. The rod 35 is disposed in the bore 30 and the bolt 31 is set up in the bore 30 to engage the forward end of the rod 35.

The shaft 9 is passed through the journal in the slide 7 until the flange 10 is seated in the socket 11. The bracket 12 is mounted on the forward end of the slide 7 by the bolts 13. The slide 7 is passed through the guide-way 8 in the post 4, the shaft 9 passing through the nut 21. It is to be understood that the shaft 9 is positioned as shown in Figs. 1 and 6 so that the screw threads 20 on the shaft 9 can pass through the unthreaded portion of the nut 21.

The parts thus assembled, the vise is mounted on the bench B by the bolts 2 and is ready for use.

I will now describe the use and operation of my improved vise. With the parts in the positions shown in Fig. 1, the slide 7 can be drawn forwardly, thus separating the jaws J and J', to permit a work piece to be inserted therebetween. The slide 7 is then pushed rearwardly so that the jaw J' is against the work piece and the handle 17 is swung clockwise as viewed in Fig. 5, thereby moving the threads 20 on the shaft 9 to engage the threads 24 on the part 21-a of the nut 21. By adjusting the nut 21 axially of the slide 7 the threads 20 and 24 can be readilly meshed. This adjustment is effected by rotation of the bolt 31 by its handle 32 since the nut 21 is moved rearwardly by advancing the bolt 31 and the rod 35, the nut 21 and the rod 35 being moved forwardly by the spring 29 when the bolt 31 is retracted.

When the nut 21 and the shaft 9 have been properly related, the threads 20 and 24 will mesh correctly. This action is facilitated by the beveled portions 20-a and 24-a.

It is obvious that the meshing of the threads 20 and 24 produces the desired clamping action of the jaws J and J' and that this effect is produced by rotation of the shaft 9 within 90° rotation.

It is also obvious that this clamping action tends to cause the nut 21 to press against the rod 35 so that its head 34 is pressed into the seat 33 of the bolt 31 and causes the split bolt 31 to spread and lock in the threaded portion of the bore 30.

Movement of the shaft 9 counter-clockwise as viewed in Fig. 5 releases the jaw J' and when the pin 19 strikes against the shoulder 15 on the bracket 12, the parts are restored to the positions shown in Fig. 1 and the slide 7 can be moved forwardly freely.

It is obvious that with this novel construction the meshing of the threads 20 and 24 is readily effected for clamping any number of work pieces of the same thickness, successively, once the nut 21 has been properly adjusted, by mere movement of the shaft 9.

Having described my invention what I claim is:

1. In a vise, the combination of a fixed jaw; a movable jaw; an operating screw carried by the movable jaw and having a mutilated thread; a nut movably mounted in the fixed jaw and having a mutilated thread; and manually operated means for moving said nut axially of said screw to effect proper relation of said screw and nut threads for meshing, said means being operable independently of said screws.

2. In a vise, the combination of a screw having threads which are interrupted over approximately 125° of the circumference of the screw; a nut slidable axially of said screw and having threads on approximately 120° of its circumference; and means operable to slide said nut to facilitate meshing of said screw and said nut, said means being operable independently of said screw.

3. In a vise, the combination of a post; a fixed jaw on said post; a slide reciprocably mounted in said post; a movable jaw on said slide; a shaft journaled in said slide; mutilated threads on said shaft; a nut slidably mounted in said post; mutilated threads in said nut, said shaft and nut threads co-acting to move said slide to clamp a work piece between said jaws on rotation of said shaft; a spring mounted in said post and biasing said nut in one direction axially of said shaft; and manually actuated means mounted in said post for moving said nut in the other direction axially of said shaft, said means being operable independently of said shaft.

4. In a vise, the combination of a fixed member having a jaw; a sliding member having a jaw; a segmental screw rotatable in said sliding member; a segmental nut slidably mounted in said fixed member, the blank spaces of said screw and said nut being arranged for sliding the screw through the nut when the screw is rotated to one position, and the screw and the nut co-acting to clamp a work piece between the jaws when the screw is rotated from said position; a spring mounted in the fixed member and biasing the nut in one direction axially of the screw; a bolt tapped in said fixed member; and a rod slidable in said fixed member and disposed between said nut and said bolt, said bolt and said rod being operable to move the nut in the opposite direction axially of said screw.

5. In a vise, the combination of a fixed jaw; a movable jaw; an operating screw carried by the movable jaw and having a mutilated thread; a nut movably mounted in the fixed jaw and having a mutilated thread; a spring in said fixed jaw biasing said nut axially of said screw; a bolt tapped in said fixed jaw and having a split end with a conical recess therein; and a rod contacting said nut and being biased toward said bolt and having a conical head seated in said recess, said bolt being operable to move said rod and said nut against the force of said spring.

CHARLES W. ELSENHEIMER.

References Cited in the file of this patent

UNITED STATES PATENTS

| Number | Name | Date |
| --- | --- | --- |
| 528,426 | Frisbie | Oct. 30, 1894 |
| 551,232 | Reese | Dec. 10, 1895 |
| 613,535 | Toles | Nov. 1, 1898 |
| 1,059,749 | Nailor et al. | Apr. 22, 1913 |
| 1,804,652 | Steiger | May 12, 1931 |